United States Patent
Kwon et al.

(10) Patent No.: US 10,854,387 B2
(45) Date of Patent: *Dec. 1, 2020

(54) CAPACITOR COMPONENT

(71) Applicant: SAMSUNG ELECTRO-MECHANICS CO., LTD., Suwon-si, Gyeonggi-do (KR)

(72) Inventors: Hyung Soon Kwon, Suwon-si (KR); Kyoung Jin Cha, Suwon-si (KR); Ji Hong Jo, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/817,793

(22) Filed: Mar. 13, 2020

(65) Prior Publication Data

US 2020/0211773 A1 Jul. 2, 2020

Related U.S. Application Data

(63) Continuation of application No. 16/275,628, filed on Feb. 14, 2019, now Pat. No. 10,643,793, which is a
(Continued)

(30) Foreign Application Priority Data

Sep. 6, 2018 (KR) .................. 10-2018-0106555

(51) Int. Cl.
*H01G 4/224* (2006.01)
*H01G 4/012* (2006.01)
(Continued)

(52) U.S. Cl.
CPC ............ *H01G 4/224* (2013.01); *H01G 4/012* (2013.01); *H01G 4/30* (2013.01); *H01G 4/12* (2013.01)

(58) Field of Classification Search
CPC .................. H01G 4/30; H01G 4/224
See application file for complete search history.

(56) References Cited

U.S. PATENT DOCUMENTS

2007/0025055 A1 2/2007 Mizuno et al.
2015/0348712 A1 12/2015 Lee et al.
(Continued)

FOREIGN PATENT DOCUMENTS

CN 105206423 A 12/2015
CN 106024380 A 10/2016
(Continued)

OTHER PUBLICATIONS

Korean Office Action dated Oct. 1, 2019 issued in Korean Patent Application No. 10-2018-0106555 (with English translation).
(Continued)

*Primary Examiner* — Eric W Thomas
(74) *Attorney, Agent, or Firm* — Morgan, Lewis & Bockius LLP (57) ABSTRACT

A capacitor component includes a capacitor component includes a body including a dielectric layer and first and second internal electrodes disposed to oppose each other with the dielectric layer interposed therebetween, and first and second external electrodes disposed on the body and electrically connected to the first and second internal electrodes. The body may include a capacitance forming portion including the first and second internal electrodes, cover portions disposed on upper and lower surfaces of the capacitance forming portion, and margin portions disposed on side surfaces of the capacitance forming portion, in which the margin portions have a hardness ranging from 8.5 GPa to 14 GPa.

17 Claims, 8 Drawing Sheets

Related U.S. Application Data continuation of application No. 16/174,547, filed on Oct. 30, 2018, now Pat. No. 10,629,377.

(51) Int. Cl.
*H01G 4/30* (2006.01)
*H01G 4/12* (2006.01)

(56) References Cited

U.S. PATENT DOCUMENTS

| | | |
|---|---|---|
| 2016/0284471 A1 | 9/2016 | Mizuno et al. |
| 2016/0293331 A1 | 10/2016 | Kitamura et al. |
| 2017/0018363 A1 | 1/2017 | Tanaka et al. |
| 2018/0182555 A1* | 6/2018 | Kowase ................. H01G 4/224 |
| 2018/0358281 A1 | 12/2018 | Akedo et al. |

FOREIGN PATENT DOCUMENTS

| | | |
|---|---|---|
| JP | 2011-035145 A | 2/2011 |
| JP | 2012-004236 A | 1/2012 |
| JP | 2017-011172 A | 1/2017 |
| JP | 2017-28013 A | 2/2017 |
| JP | WO2017/146132 A1 | 8/2017 |

OTHER PUBLICATIONS

U.S. Notice of Allowance dated Dec. 16, 2019 issued in U.S. Appl. No. 16/275,628.
U.S. Final Office Action dated Sep. 10, 2019 issued in U.S. Appl. No. 16/275,628.
U.S. Non-Final Office Action dated Apr. 11, 2019 issued in U.S. Appl. No. 16/275,628.
Chinese Office Action dated Jun. 18, 2020 issued in Chinese Patent Application No. 201811609792.7 (with English translation).

* cited by examiner

CAPACITOR COMPONENT

CROSS-REFERENCE TO RELATED APPLICATION(S)

This application is a continuation of U.S. patent application Ser. No. 16/275,628, filed on Feb. 14, 2019, which is a continuation of U.S. patent application Ser. No. 16/174,547 filed on Oct. 30, 2018, which claims the benefit of priority to Korean Patent Application No. 10-2018-0106555 filed on Sep. 6, 2018 in the Korean Intellectual Property Office, the disclosures of which are incorporated herein by reference in their entireties.

TECHNICAL FIELD

The present disclosure relates to a capacitor component.

BACKGROUND

A multilayer ceramic capacitor (MLCC) is a chip-type condenser mounted on the printed circuit substrates of a variety of electronic products such as an image display device, including liquid crystal displays (LCD) and plasma display panels (PDP), computers, smartphones, cellular phones, and the like, serving to charge and discharge electricity.

A multilayer ceramic capacitor may be used as a component of various electronic devices as it is relatively small in size and is able to secure high capacity while being easily installed. As electronic devices such as computers, mobile devices, and the like, are miniaturized and increased in power, there has been increased demand for miniaturized and high capacity multilayer ceramic capacitors.

To simultaneously achieve miniaturization and high capacity, the number of layers may need to be increased by configuring thicknesses of a dielectric layer and an internal electrode to be thin. Recently, a thickness of approximately 0.6 µm has been achieved, and the thickness continues to be reduced.

However, in the case in which a thickness of a dielectric layer is configured to be less than 0.6 µm, it may be difficult to secure voltage withstand properties, and degradation of insulation resistance of a dielectric layer may increase, which may cause degradation of quality and yield, or other problems.

Also, in the related art, to compare voltage withstand properties of multilayer ceramic capacitors, a breakdown voltage (BDV) value has to be measured at the time when multilayer ceramic capacitors are broken down, while continuously increasing applied voltage, and thus, it has not been easy to compare voltage withstand properties.

SUMMARY

An aspect of the present disclosure is to provide a capacitor component having excellent voltage withstand properties, and also to provide a new parameter on which voltage withstand properties may be estimated.

According to an aspect of the present disclosure, a capacitor component includes a body including a dielectric layer and first and second internal electrodes disposed to oppose each other with the dielectric layer interposed therebetween, and first and second external electrodes disposed on the body and electrically connected to the first and second internal electrodes. The body may include a capacitance forming portion including the first and second internal electrodes, cover portions disposed on upper and lower portions of the capacitance forming portion, and margin portions disposed on side surfaces of the capacitance forming portion, in which the margin portions have a hardness ranging from 8.5 GPa to 14 GPa.

According to another aspect of the present disclosure, a capacitor component includes a body including a dielectric layer and first and second internal electrodes disposed to oppose each other with the dielectric layer interposed therebetween, and first and second external electrodes disposed on the body and electrically connected to the first and second internal electrodes. The body may include a capacitance forming portion including the first and second internal electrodes, cover portions disposed on upper and lower portions of the capacitance forming portion, and margin portions disposed on side surfaces of the capacitance forming portion, in which the margin portions are divided into first areas adjacent to the first and second internal electrodes and second areas adjacent to an external surface of the body, and the first areas have a hardness ranging from 8.5 GPa to 14 GPa.

According to still another aspect of the present disclosure, a capacitor component includes a body including a dielectric layer and first and second internal electrodes disposed to oppose each other with the dielectric layer interposed therebetween, and first and second external electrodes disposed on the body and electrically connected to the first and second internal electrodes. The body may include a capacitance forming portion including the first and second internal electrodes, cover portions disposed on upper and lower portions of the capacitance forming portion, and margin portions disposed on side surfaces of the capacitance forming portion, in which the cover portions have a hardness ranging from 8.5 GPa to 14 GPa.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of the elements in the drawings can be exaggerated for clear description. Also, elements having the same function within the scope of the same concept represented in the drawing of each exemplary embodiment will be described using the same reference numeral.

In the drawings, irreverent descriptions will be omitted to clearly describe the present disclosure, and to clearly express a plurality of layers and areas, thicknesses may be magnified. Elements having the same function within the scope of the same concept will be described with use of the same reference numeral. Further, throughout the specification, it will be understood that when a part "includes" an element, it may further include another element, not excluding another element, unless otherwise indicated.

In the drawings, an X direction is a second direction, an L direction, or a length direction, a Y direction is a third direction, a W direction, or a width direction, a Z direction is a first direction, a layering direction, a T direction, or a thickness direction.

Capacitor Component

Figure 1:
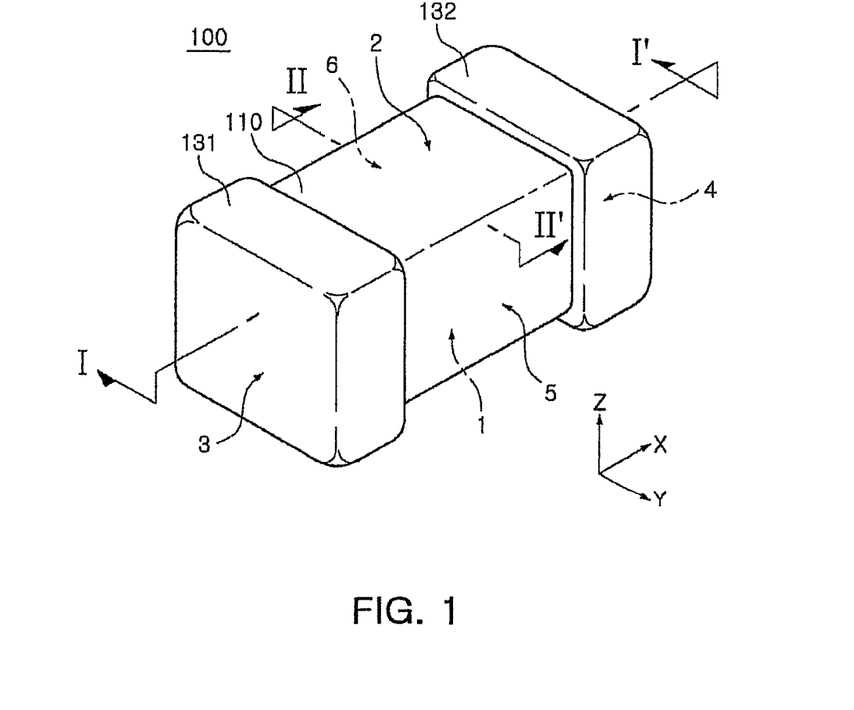
FIG. 1 is a perspective diagram illustrating a capacitor component according to an exemplary embodiment in the present disclosure.

FIG. 1 is a perspective diagram illustrating a capacitor component according to an exemplary embodiment.

Figure 2:
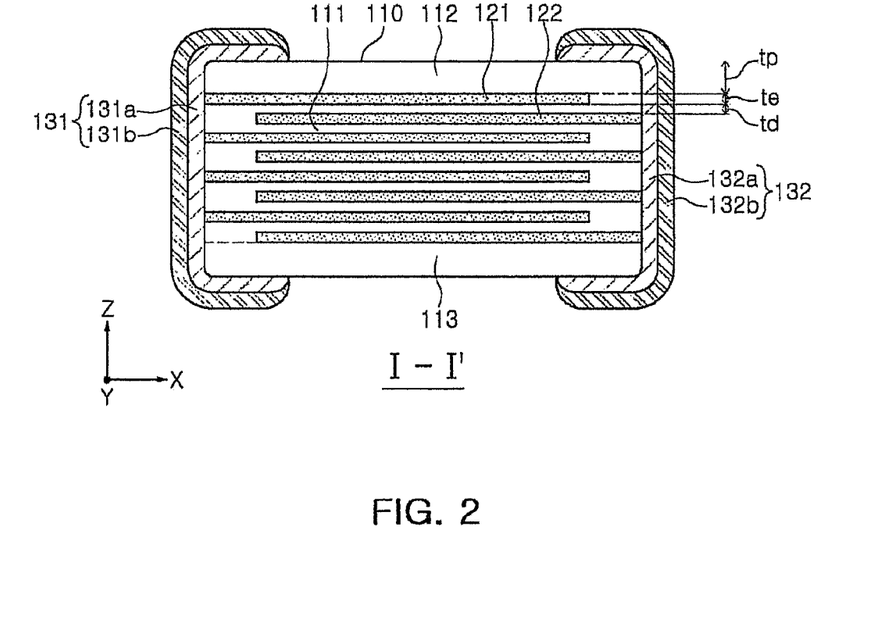
FIG. 2 is a cross-sectional diagram taken along line I-I' in FIG. 1.

FIG. 2 is a cross-sectional diagram taken along line I-I' in FIG. 1.

Figure 3:
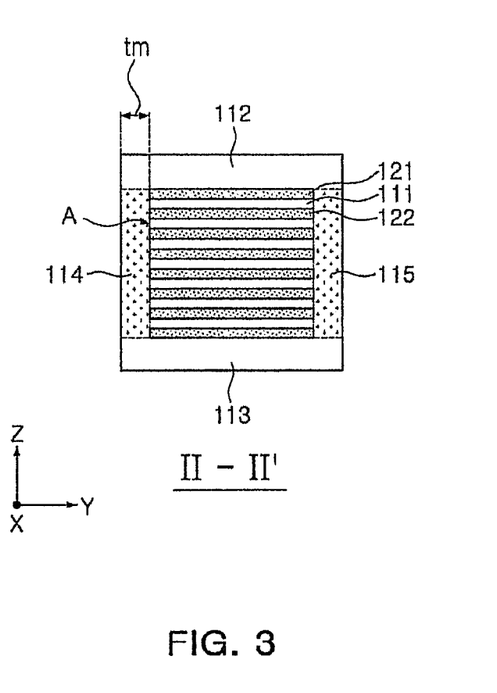
FIG. 3 is a cross-sectional diagram taken along line II-II' in FIG. 1.

FIG. 3 is a cross-sectional diagram taken along line II-II' in FIG. 1.

Figure 4A:
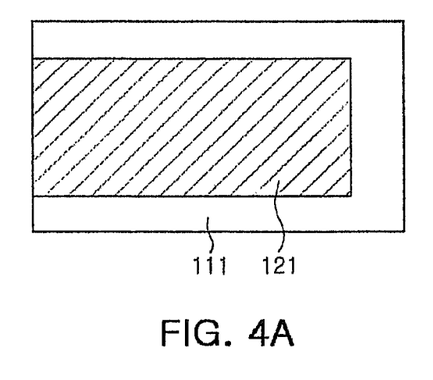
FIG. 4A is a diagram illustrating a ceramic green sheet on which a first internal electrode is printed.
Figure 4B:
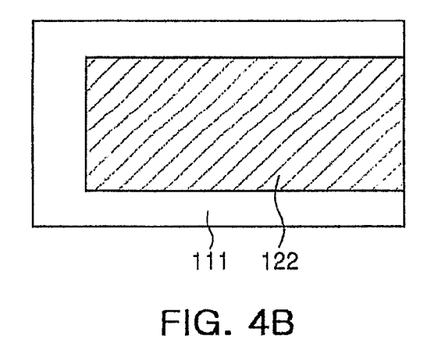
FIG. 4B is a ceramic green sheet on which a second internal electrode is printed.

FIGS. 4A and 4B are diagrams illustrating a ceramic green sheet on which an internal electrode is printed to manufacture a body of a capacitor component according to an exemplary embodiment.

FIG. 4A is a diagram illustrating a ceramic green sheet on which a first internal electrode is printed, and FIG. 4B is a ceramic green sheet on which a second internal electrode is printed.

Referring to FIGS. 1 to 4A and 4B, a capacitor component 100 according to an exemplary embodiment may include a body 110 configured to include a dielectric layer 111 and first and second internal electrodes 121 and 122 disposed to oppose each other with the dielectric layer interposed therebetween, first and second surfaces 1 and 2 opposing each other, third and fourth surfaces 3 and 4 connected to the first and second surfaces and opposing each other, and fifth and sixth surfaces 5 and 6 connected to the first to fourth surfaces and opposing each other, and first and second external electrodes 131 and 132 configured to be disposed on the body 110 and to be electrically connected to the first and second internal electrodes. The body 110 may include a capacitance forming portion A forming capacitance including the first and second internal electrodes disposed to oppose each other with the dielectric layer interposed therebetween, cover portions 112 and 113 disposed in upper and lower portions of the capacitance forming portion, margin portions 114 and 115 disposed on side surfaces of the capacitance forming portion, and the margin portions may have a hardness ranging from 8.5 GPa to 14 GPa.

According to one aspect of the present disclosure, the cover portions 112 and 113 may have a hardness ranging from 8.5 GPa to 14 GPa.

The dielectric layer 111 and the internal electrodes 121 and 122 may be alternately layered in the body 110.

There may be no particular limitation on a shape of the body 110, but as illustrated in the diagram, the body 110 may have a hexagonal shape or a shape similar to a hexagon. Due to shrinkage of a ceramic powder included in the body 110 during a process of sintering, the body 110 may not be an exact hexagon, but may have a substantially hexagonal shape.

The body 110 may have the first and second surfaces 1 and 2 opposing each other in a thickness direction (a Z direction), the third and fourth surfaces 3 and 4 connected to the first and second surfaces 1 and 2 and opposing each other in a length direction (an X direction), and the fifth and sixth surfaces 5 and 6 connected to the first and second surfaces 1 and 2 and the third and fourth surfaces 3 and 4, and opposing each other in a width direction (a Y direction).

The plurality of dielectric layers 111 forming the body 110 may be in a sintered state, and the dielectric layers 111 may be integrated, such that boundaries between adjacent dielectric layers 111 may be difficult to identify without using a scanning electron microscope (SEM).

A material forming the dielectric layer 111 may not be particularly limited as long as sufficient capacitance is able to be obtained. For example, a material of the dielectric layer 111 may be a barium titanate ($BaTiO_3$) power. As the material composing the dielectric layer 111, various ceramic additives, organic solvents, coupling agents, dispersing agents, and the like, may be added in addition to barium titanate ($BaTiO_3$) powder, or the like, depending on an intended purpose.

The internal electrodes 121 and 122 may be alternately layered with the dielectric layer, and may include the first and second internal electrodes 121 and 122. The first and second internal electrodes 121 and 122 may be alternately disposed to oppose each other with the dielectric layer interposed therebetween, and may be exposed to the third and fourth surfaces 3 and 4 of the body 110, respectively.

Referring to FIG. 2, the first internal electrode 121 may be spaced apart from the fourth surface 4, and may be exposed through the third surface 3. The second internal electrode 122 may be spaced apart from the third surface 3, and may be exposed through the fourth surface 4.

In this case, the first and second internal electrodes 121 and 122 may be electrically separated from each other by the dielectric layer 111 disposed therebetween. Referring to FIGS. 4A and 4B, the body 110 may be formed by alternately layering a ceramic green sheet a on which the first internal electrode 121 is printed and a ceramic green sheet b on which the second internal electrode 122 is printed, and being sintered.

A material forming the first and second internal electrodes 121 and 122 may not be particularly limited, and may be formed of a conductive paste comprised of more than one material among noble metals such as palladium (Pd), palladium-silver (Pd—Ag) alloy, and the like, and nickel (Ni) and copper (Cu), for example.

As the method of printing the conductive paste, a screen printing method, a gravure printing method, or the like, may be used, but the method of printing is not limited thereto.

The capacitor component 100 according to an exemplary embodiment may include a capacitance forming portion A forming capacitance including the first and second internal electrodes 121 and 122 disposed to oppose each other with the dielectric layer interposed therebetween, cover portions 112 and 113 disposed in upper and lower portions of the capacitance forming portion, margin portions 114 and 115 disposed on side surfaces of the capacitance forming portion.

The capacitance forming portion A may serve to form capacitance of a capacitor, and may be formed by repeatedly layering the plurality of internal electrodes 121 and 122 with the dielectric layer interposed therebetween.

The upper cover portion 112 and the lower cover portion 113 may not include an internal electrode, and may include the same material as that of the dielectric layer 111.

In other words, the upper cover portion 112 and the lower cover portion 113 may include a ceramic material, such as a barium titanate (BaTiO$_3$) ceramic material, for example.

The upper cover portion 112 and the lower cover portion 113 may be formed by layering a single dielectric layer or two or more dielectric layers on upper and lower surfaces of the capacitance forming portion A in upper and lower directions, respectively, and may serve to prevent damage to an internal electrode caused by physical or chemical stress.

The margin portions 114 and 115 may include the margin portion 114 disposed on the sixth surface 6 of the body 110 and the margin portion 115 disposed on the fifth surface 5.

The margin portions 114 and 115 may be disposed on both surfaces of the body 110 in a width direction.

As illustrated in FIG. 3, the margin portions 114 and 115 may refer to an area between both ends of the first and second internal electrodes 121 and 122 and a boundary surface of the body 110.

The margin portions 114 and 115 may serve to prevent damage to an internal electrode caused by physical or chemical stress.

The margin portions 114 and 115 may also serve to secure voltage withstand properties by adjusting a hardness of the margin portions 114 and 115 to be within a range of 8.5 GPa to 14 GPa.

To simultaneously achieve miniaturization and high capacity of a multilayer ceramic capacitor, the number of layers may have to be increased by configuring thicknesses of a dielectric layer and an internal electrode to be thin. Recently, a thickness of approximately 0.6 μm has been achieved, and the thickness continues to be lowered.

However, in the case in which a thickness of a dielectric layer is configured to be less than 0.6 μm, it may be difficult to secure voltage withstand properties, and degradation of insulation resistance of a dielectric layer may increase, which may cause degradation of quality and yield, or other problems.

Particularly, when an analysis of a chip breakdown mode is carried out, a breakdown of the margin portions 114 and 115 occurs often. Thus, to improve voltage withstand properties, it may be required to control the properties of the margin portions 114 and 115.

According to the exemplary embodiment, in the case in which a hardness of the margin portions 114 and 115 is controlled to be within a range of 8.5 GPa to 14 GPa, insulation breakdown may be prevented, and voltage withstand properties may improve. Also, voltage withstand properties may be sufficiently predicted by only measuring a hardness of the margin portions 114 and 115 and determining whether a hardness value of the margin portions 114 and 115 satisfies within a range of 8.5 GPa to 14 GPa, without applying an electric field until insulation breakdown occurs.

In the case in which a hardness of the margin portions 114 and 115 is 8.5 GPa or lower, it may be difficult to secure voltage withstand properties, and to control a hardness value of the margin portions 114 and 115 to exceed 14 GPa, excessive costs may be incurred or productivity may degrade.

Meanwhile, a method of controlling a hardness of the margin portions 114 and 115 may not be particularly limited. For example, a hardness of the margin portions 114 and 115 may be controlled by adjusting a density of the margin portions 114 and 115. The higher the density of the margin portions 114 and 115, the higher the hardness of the margin portions 114 and 115 may be, and the lower the density of the margin portions 114 and 115, the lower the hardness of the margin portions 114 and 115 may be.

Figure 5:
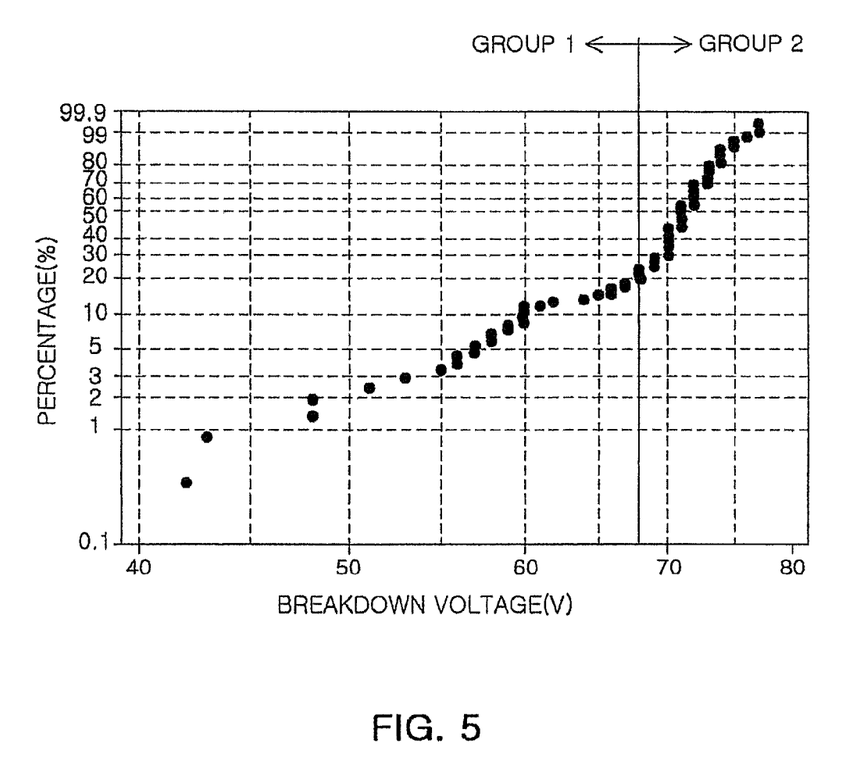
FIG. 5 is a diagram illustrating a Weibull distribution according to breakdown voltage in samples in which margin portions have different hardnesses.
Figure 6:
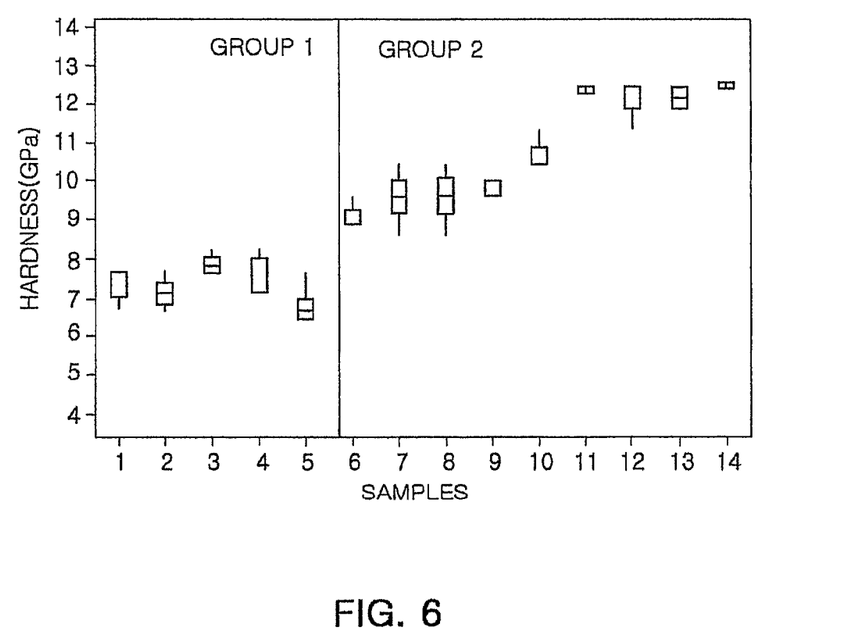
FIG. 6 is graphs showing hardness values of margin portions measured in samples selected from group 1 and group 2 in FIG. 5.

FIG. 5 is a diagram illustrating a Weibull distribution according to breakdown voltage in samples in which margin portions have different hardnesses. FIG. 6 is graphs showing hardness values of margin portions measured in samples selected from group 1 and group 2 in FIGS. 4A and 4B.

With respect to 60 samples in which hardnesses of margin portions are different from one another, a breakdown voltage (BDV) value at the time when a sample chip was broken down was measured while sequentially increasing applied voltage, and the measured values were represented in Weibull distribution.

The Weibull distribution is one of continuous probability distributions, and is used in a lifetime data analysis. Specifically, the Weibull distribution is a probability distribution with which how a probability of breakdown changes over time can be estimated, and may be obtained by a probability density function as Equation 1 below.

[Equation 1]

$$f(t)=\alpha\lambda(\lambda t)\alpha-1\ e-(\lambda t)\alpha,\ t\geq 0$$

(α: a shape parameter), λ: a scale parameter))

The change in inclination in the Weibull distribution may indicate that the probability density function changes, which tells that a cause of lifetime breakdown also changes. Thus, the distribution is divided into group 1 and group 2 with reference to a point where an inclination radically changes.

Five samples (samples 1 to 5) were selected from group 1, nine samples (samples 6 to 14) were selected from group 2, and each of the samples was cut as in FIG. 3. Then, hardnesses were measured at five points spaced apart from each other by equal intervals in the margin portion 114 disposed on the sixth surface 6 of the body 110 and in the margin portion 115 disposed on the fifth surface 5, and hardness values were measured at ten points in each sample. The results are shown in FIG. 6.

In the case of group 1 in which breakdown voltage was low, a hardness value of the margin portion was less than 8.5 GPa, and in the case of group 2 in which breakdown voltage was high, a hardness value of the margin portion satisfied between 8.5 GPa and 14 GPa.

Also, voltage withstand properties were sufficiently predicted by only measuring a hardness of the margin portions of the capacitor without applying an electric field until insulation breakdown occurs.

Also, the margin portions 114 and 115 may have a hardness higher than a hardness of the dielectric layer 111 of the capacitance forming portion A.

When an analysis of a chip breakdown mode is carried out, breakdown of the margin portions 114 and 115 occurs often. Thus, according to the exemplary embodiment, in the case in which a hardness of the margin portions 114 and 115 is configured to be within a range of 8.5 GPa to 14 GPa, voltage withstand properties may be secured even when a hardness of the dielectric layer 111 is relatively low.

Thickness tm of the margin portions 114 and 115 may not be particularly limited. However, to achieve miniaturization and high capacity of the capacitor component, thicknesses of the margin portions 114 and 115 may be 20 µm or less. According to the exemplary embodiment, in the case in which a hardness of the margin portions 114 and 115 is secured within a range of 8.5 GPa to 14 GPa, voltage withstand properties may be secured even when thicknesses of the margin portions 114 and 115 are 20 µm or less.

Also, thicknesses te of the first and second internal electrodes 121 and 122 may not be particularly limited. However, to achieve miniaturization and high capacity of the capacitor component, thicknesses of the first and second internal electrodes 121 and 122 may be 0.4 µm or less.

Thicknesses of the first and second internal electrodes 121 and 122 may refer to an average thickness of the first and second internal electrodes 121 and 122.

An average thickness of the first and second internal electrodes 121 and 122 may be measured by scanning a cross-section of the body 110 taken in a length and thickness direction (an L-T direction) using an SEM.

For example, a random image of the first and second internal electrodes 121 and 122 may be extracted from a scanned image of a cross-section taken in a length and thickness direction (an L-T direction), created by cutting a central portion of the body 110 in a width direction, using an SEM, and an average of thicknesses of 30 points at equal intervals, measured in a length direction, may be calculated.

The 30 points spaced apart from each other by equal intervals may be measured in a capacitance forming portion which refer to an area of overlap between the first and second internal electrodes 121 and 122.

A thickness of the dielectric layer 111 may not be particularly limited.

However, in the case in which a thickness of the dielectric layer 111 is configured to be lower than 0.6 µm, particularly, being configured to be 0.4 µm or less, it may be difficult to secure voltage withstand properties as it is difficult to control a process defect occurring in the margin portions. Also, defects of degradation in insulation resistance (IR) of the dielectric layer may increase, which may cause degradation of quality and yield, or other problems.

As described above, according to the exemplary embodiment, in the case in which a hardness of the margin portions 114 and 115 is within a range of 8.5 GPa to 14 GPa, voltage withstand properties of the capacitor component may improve, and breakdown voltage (BDV) and reliability may also improve. Thus, even when a thickness td of the dielectric layer 111 is 0.4 µm or less, sufficient voltage withstand properties may be secured.

Thus, even when a thickness td of the dielectric layer 111 is 0.4 µm or less, the effect of voltage withstand properties and reliability may become more prominent.

A thickness of the dielectric layer 111 may refer to an average thickness of the dielectric layers 111 interposed between the first and second internal electrodes 121 and 122.

An average thickness of the dielectric layers 111 may be obtained by scanning a cross-section of the body 110 taken in a length and thickness direction (an L-T direction) using an SEM.

For example, example, a random image of the dielectric layer may be extracted from a scanned image of a cross-section taken in a length and thickness direction (an L-T direction), created by cutting a central portion of the body 110 in a width direction, using an SEM, and an average of thicknesses of 30 points at equal intervals, measured in a length direction, may be calculated.

The 30 points spaced apart from each other by equal intervals may be measured in a capacitance forming portion which refer to an area of overlap between the first and second internal electrodes 121 and 122.

Thicknesses of the cover portions 112 and 113 may not be particularly limited. However, to achieve miniaturization and high capacity in the capacitor component, thicknesses of the cover portions 112 and 113 may be 20 µm or less. According to the exemplary embodiment, in the case in which a hardness of the margin portions 114 and 115 is secured within a range of 8.5 GPa to 14 GPa, voltage withstand properties may be secured even when thicknesses of the cover portions 112 and 113 are 20 µm or less.

The external electrodes 131 and 132 may be disposed in the body 110 and connected to the internal electrodes 121 and 122. As illustrated in FIG. 2, the external electrodes 131 and 132 may include the first and second external electrodes 131 and 132 connected to the first and second internal electrodes 121 and 122, respectively. In the exemplary embodiment, the capacitor component 100 may be configured to have the two external electrodes 131 and 132, but the number and a shape of the external electrodes 131 and 132 may change depending on a shape of the internal electrodes 121 and 122, or other different purposes.

Meanwhile, the first and second external electrodes 131 and 132 may be formed of any material having electrical conductivity such as a metal, and a specific material thereof may be determined by considering electrical properties, structural stability, and the like.

For example, the external electrodes 131 and 132 may include electrode layers 131a and 132a disposed on the body 110, and plating layers 131b and 132b disposed on the electrode layers 131a and 132a.

Specifically, for example, the electrode layers 131a and 132a may be sintered electrodes including a conductive metal and glass, and the conductive metal may be Cu. Also, the electrode layers 131a and 132a may be resin electrodes including a plurality of metal particles and a conductive resin.

Also, the plating layers 131b and 132b may be, for example, a Ni plated layer or a Sn plated layer. The Ni plated layer and the Sn plated layer may be sequentially disposed on the electrode layers 131a and 132a, and a plurality of the Ni plated layers, and a plurality of the Sn plated layers may be included.

Meanwhile, a size of the ceramic electronic component 100 may not be particularly limited.

However, to simultaneously achieve miniaturization and high capacitance of the ceramic electronic component, the number of layers may need to be increased by configuring thicknesses of a dielectric layer and internal electrodes to be low, and accordingly, in the case of the ceramic electronic component having a size of "0402" (0.4 mm×0.2 mm) or less, the improvement of voltage withstand properties (BDV) and reliability according to the exemplary embodiment may become more prominent.

Thus, in the case in which a distance between third and fourth surfaces 3 and 4 of the body 110 is defined as L, and a distance between fifth and sixth surfaces 5 and 6 of the body 110 is defined as W, L may be 0.4 mm or less, and W may be 0.2 mm or less.

In other words, the ceramic electronic component may be implemented as a ceramic electronic component having a size of "0402" (0.4 mm×0.2 mm).

Figure 7:
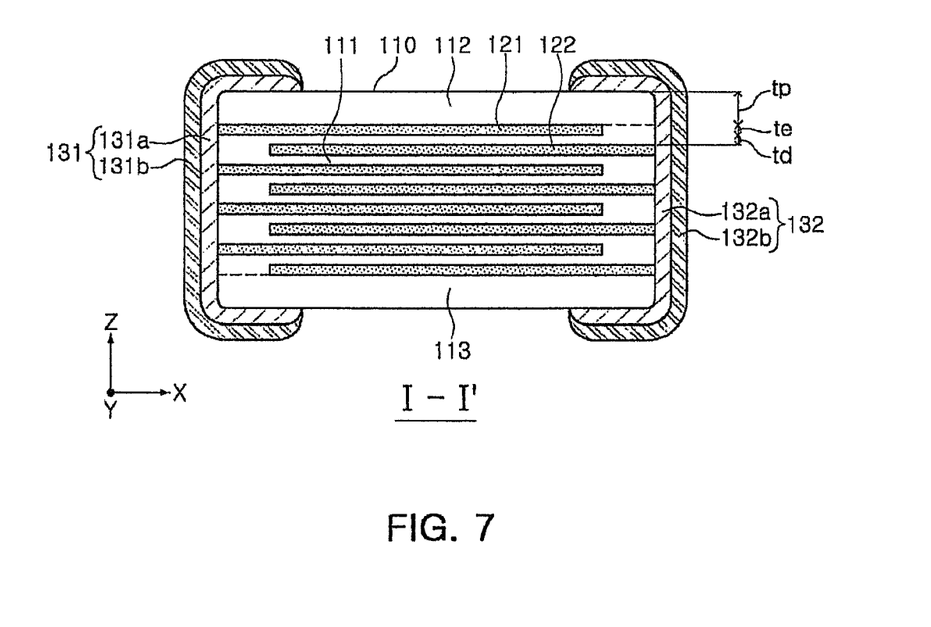
FIG. 7 is a cross-sectional diagram taken along line II-II' in FIG. 1 according to another exemplary embodiment in the present disclosure.

FIG. 7 is a cross-sectional diagram taken along line II-II' in FIG. 1 according to another exemplary embodiment.

Figure 8:
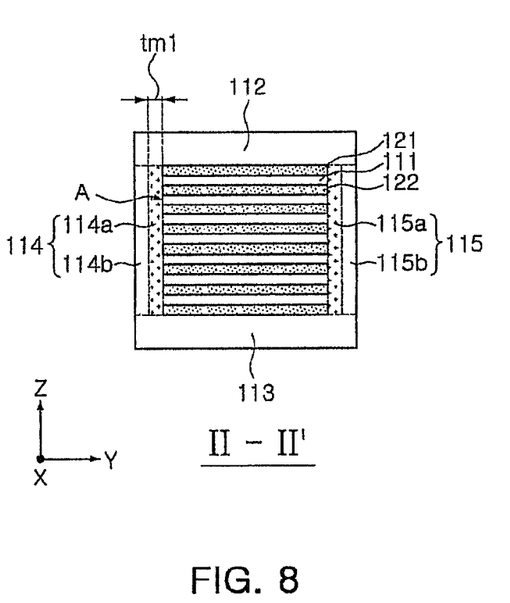
FIG. 8 is a cross-sectional diagram taken along line II-II' in FIG. 1 according to another exemplary embodiment in the present disclosure.

FIG. 8 is a cross-sectional diagram taken along line II-II' in FIG. 1 according to another exemplary embodiment.

In the description below, another exemplary embodiment will be described with reference to FIGS. 7 and 8. However, to avoid overlapped descriptions, the same descriptions of a capacitor component as the aforementioned descriptions will not be repeated.

The capacitor component according to another exemplary embodiment may include a body 110 configured to include a dielectric layer 111 and first and second internal electrodes 121 and 122 disposed to oppose each other with the dielectric layer interposed therebetween, first and second surfaces 1 and 2 opposing each other, third and fourth surfaces 3 and 4 connected to the first and second surfaces and opposing each other, and fifth and sixth surfaces 5 and 6 connected to the first to fourth surfaces and opposing each other, and first and second external electrodes 131 and 132 configured to be disposed on the body 110 and to be electrically connected to the first and second internal electrodes. The body 110 may include a capacitance forming portion A forming capacitance including the first and second internal electrodes disposed to oppose each other with the dielectric layer interposed therebetween, cover portions 112 and 113 disposed in upper and lower portions of the capacitance forming portion, margin portions 114 and 115 disposed on side surfaces of the capacitance forming portion, the margin portions 114 and 115 may be divided into first areas 114a and 115a adjacent to the first and second internal electrodes and second areas 114b and 115b adjacent to an external surface of the body 110, and the first areas 114a and 115a may have a hardness ranging from 8.5 GPa to 14 GPa.

When an analysis of a chip breakdown mode is carried out, breakdown of the margin portions 114 and 115 occurs often. Especially, insulation breakdown mostly occurs in the first areas 114a and 115a adjacent to the first and second internal electrodes. Thus, it may be necessary to control a hardness of the first areas 114a and 115a to be within a range of 8.5 GPa to 14 GPa to improve voltage withstand properties.

In this case, a hardness of the first areas 114a and 115a may be higher than a hardness of the second areas 114b and 115b.

As breakdown often occurs in the first areas 114a and 115a when an analysis of a chip breakdown mode is carried out, in the case in which a hardness of the first areas 114a and 115a is configured to be within a range of 8.5 GPa to 14 GPa according to the exemplary embodiment, voltage withstand properties may be secured even when a hardness of the second areas 114b and 115b is relatively low.

Also, a hardness of the first areas 114a and 115a may be higher than a hardness of the dielectric layer 111 of the capacitance forming portion A.

As breakdown often occurs in the first areas 114a and 115a when an analysis of a chip breakdown mode is carried out, in the case in which a hardness of the first areas 114a and 115a is configured to be within a range of 8.5 GPa to 14 GPa according to the exemplary embodiment, voltage withstand properties may be secured even when a hardness of the dielectric layer 111 of the capacitance forming portion A is relatively low.

Also, the first areas 114a and 115a may have a thickness of 20 μm or less.

To achieve miniaturization and high capacity of the capacitor component, the first areas 114a and 115a may have a thickness of 20 μm or less. In the case in which the first areas 114a and 115a is configured to have a hardness ranging from 8.5 GPa to 14 GPa, voltage withstand properties may be secured even when a thickness of the first areas 114a and 115a is 20 μm or less.

According to the aforementioned exemplary embodiments, a capacitor component having excellent voltage withstand properties may be provided.

Also, a new parameter on which voltage withstand properties is able to be estimated may be provided.

While the exemplary embodiments have been shown and described above, it will be apparent to those skilled in the art that modifications and variations could be made without departing from the scope of the present invention as defined by the appended claims.

What is claimed is:

1. A capacitor component, comprising:
a body including a dielectric layer and first and second internal electrodes disposed to oppose each other with the dielectric layer interposed therebetween; and
first and second external electrodes disposed on the body and electrically connected to the first and second internal electrodes respectively,
wherein the body comprises a capacitance forming portion including the first and second internal electrodes, cover portions disposed on upper and lower surfaces of the capacitance forming portion, and margin portions disposed on side surfaces of the capacitance forming portion, the margin portions having a hardness greater than a hardness of a dielectric layer of the capacitance forming portion,
the margin portions have a hardness ranging from 8.5 GPa to 14 GPa, and
the dielectric layer has a thickness of 0.4 μm or less.

2. The capacitor component of claim 1, wherein the margin portions have a thickness of 20 μm or less.

3. The capacitor component of claim 1, wherein the first and second internal electrodes each have a thickness of 0.4 μm or less.

4. The capacitor component of claim 1, wherein the cover portions have a thickness of 20 μm or less.

5. The capacitor component of claim 1, wherein the body has first and second surfaces opposing each other, third and fourth surfaces opposing each other and connected to the first and second surfaces, and fifth and sixth surfaces opposing each other and connected to the first to fourth surfaces.

6. The capacitor component of claim 5, wherein a distance between the third and fourth surfaces of the body is 0.4 mm or less, and a distance between the fifth and sixth surfaces of the body is 0.2 mm or less.

7. A capacitor component, comprising:
a body including a dielectric layer and first and second internal electrodes disposed to oppose each other with the dielectric layer interposed therebetween; and
first and second external electrodes disposed on the body and electrically connected to the first and second internal electrodes,
wherein the body comprises a capacitance forming portion including the first and second internal electrodes, cover portions disposed on upper and lower surfaces of the capacitance forming portion, and margin portions disposed on side surfaces of the capacitance forming portion, the margin portions being divided into first areas adjacent to the first and second internal electrodes and second areas adjacent to an external surface of the body, the first areas having a hardness greater than a hardness of the second areas, the first areas have a hardness ranging from 8.5 GPa to 14 GPa, and the dielectric layer has a thickness of 0.4 µm or less.

8. The capacitor component of claim 7, wherein the first areas have a hardness greater than a hardness of a dielectric layer of the capacitance forming portion.

9. The capacitor component of claim 7, wherein the first areas have a thickness of 20 µm or less.

10. The capacitor component of claim 7, wherein the first and second internal electrodes each have a thickness of 0.4 µm or less.

11. The capacitor component of claim 7, wherein the cover portions have a thickness of 20 µm or less.

12. The capacitor component of claim 7, wherein the body has first and second surfaces opposing each other, third and fourth surfaces opposing each other and connected to the first and second surfaces, and fifth and sixth surfaces opposing each other and connected to the first to fourth surfaces.

13. The capacitor component of claim 12, wherein a distance between the third and fourth surfaces of the body is 0.4 mm or less, and a distance between the fifth and sixth surfaces of the body is 0.2 mm or less.

14. A capacitor component, comprising:

a body including a dielectric layer and first and second internal electrodes disposed to oppose each other with the dielectric layer interposed therebetween; and first and second external electrodes disposed on the body and electrically connected to the first and second internal electrodes, wherein the body comprises a capacitance forming portion including the first and second internal electrodes, cover portions disposed on upper and lower surfaces of the capacitance forming portion, and margin portions disposed on side surfaces of the capacitance forming portion, the margin portions having a hardness greater than a hardness of a dielectric layer of the capacitance forming portion, the margin portions have a hardness ranging from 8.5 GPa to 14 GPa, and the first and second internal electrodes each have a thickness of 0.4 µm or less.

15. The capacitor component of claim 14, wherein the cover portions have a hardness ranging from 8.5 GPa to 14 GPa.

16. The capacitor component of claim 14, wherein the margin portions have a thickness of 20 µm or less, and the cover portions have a thickness of 20 µm or less.

17. The capacitor component of claim 14, wherein the dielectric layer has a thickness of 0.4 µm or less.

* * * * *